United States Patent Office 3,534,366
Patented Oct. 13, 1970

3,534,366
METHOD AND APPARATUS FOR PRODUCING AN OMNIDIRECTIONAL RADIO SIGNAL
Peter M. Guldenpfennig, Munich, Germany, assignor to Entwicklungsring Sud GmbH, Munich, Germany
Filed Oct. 25, 1968, Ser. No. 770,705
Claims priority, application Germany, Oct. 31, 1967,
1,591,118
Int. Cl. G01s 1/44
U.S. Cl. 343—106                                14 Claims

ABSTRACT OF THE DISCLOSURE

A method and apparatus for producing and receiving a VHF omnidirectional radio signal including means for providing fine as well as coarse bearing indications. A conventional VOR transmitter is modified by superimposing a second supplemental frequency upon a carrier signal to produce a second signal removed from the carrier signal by the frequency of the rotating antenna. The supplemental frequency is radiated from an omnidirectional antenna during a short blanking interval of the rotating directional antenna. At the receiving location, means are included for separating the supplemental frequency from the carrier and supplying it to precision measuring equipment. The measuring equipment includes a phase comparator network which derives a control voltage from the azimuth-dependent signal and the second supplementary signal. This control voltage then serves to provide a precision bearing indication.

BACKGROUND OF THE INVENTION

This invention relates to a method and apparatus for producing and receiving a VHF omnidirectional radio signal for air navigation utilizing a carrier in the 108–118 mhz. band for coarse bearing indication which is radiated from an omnidirectional antenna. The carrier is amplitude-modulated with a 9.96 kHz. sub-carrier which in turn is frequency-modulated by a 30 Hz. reference signal. The directional antenna radiates only the carrier and rotates at 30 r.p.s.

The VOR system is currently the most common civil navigation system. Because operation is in the VHF portion of the radio spectrum, interference from atmospheric and precipitation static is negligible. Another advantage of this system is that it produces an unlimited number of radials. The bearing indication error is relatively high in comparison with other complex navigation systems, and lies somewhere in the region of $\pm 2°$.

It is the object of the present invention to modify the existing VOR system to permit determination of bearing with substantially higher precision. Serving this end, the presently available equipment is to be usable with the modified VOR system by means of an economical modification. The receiving equipment is to be used together with a modified VOR omnirange in the same manner as with previous VOR systems.

Generally, the desired features are obtained by producing, for purposes of a precision bearing indication, a 30 Hz. azimuth-dependent phase beat. The phase beat is obtained by superimposing a second, additional frequency upon the carrier radiated from the omnidirectional antenna during a short blanking interval in the radiation from the rotating directional antenna.

A VOR system operating in accordance with the features of the illustrated embodiment has the advantage that after the usual coarse azimuth measurement a precision measurement is made which improves bearing accuracy obtained through coarse measurement by at least a factor of 10. Another feature of the illustrated embodiment is the production of a 30 Hz. azimuth-dependent beat by radiating the second supplementary frequency. This second frequency is radiated from a supplementary omnidirectional antenna which is located at a distance preferably equal to a whole multiple of a wavelength of the nondirectional carrier, and by having a 30 Hz. separation between the second supplementary frequency and the frequency of the carrier radiated from the omnidirectional antenna. The supplemental antenna produces 8 precision measurement sectors, in each of which, the phase angle of the beat frequency sweeps 360°.

With respect to the preferred embodiment, the omnidirectional antenna and the supplementary antenna which produces 8 precision measurement sectors, are located at a distance equal to twice the wavelength of the nondirectional carrier.

As previously mentioned certain features are achieved in the illustrated embodiment by adding additional items to the conventional VOR equipment arrangement. More particularly, the conventional equipment generally includes an oscillator, a generator producing a 9.96 kHz. signal which is frequency-modulated by a 30 Hz. sub-carrier, modulation controlled omnidirectional antenna, output stages, and rotating directional antennas. The additional equipment consists of a second antenna connected by means of a first RF switch to a supplementary oscillator. This supplementary oscillator generates a second supplementary frequency. The supplementary frequency varies with respect to the nondirectional carrier radiated from the omnidirectional antenna by 30 Hz. In addition, a second RF switch is provided between the output stage and the directional antenna. This switch, in combination with the first RF switch alternately cuts in first, the supplementary antenna and then the rotating directional antenna. Finally phase and frequency control devices are provided to maintain the 30 Hz. separation, so that the supplementary frequency and the nondirectional carrier are in a fixed phase and frequency relationship relative to the 30 Hz. signal supplied by the generator.

Apparatus for practicing this method includes at the receiving location, a superhet receiver fed by the receiving antenna. This receiver supplies at its output, the 9.96 kHz. signal frequency modulated by a 30 Hz. reference signal and the azimuth-dependent 30 Hz. signal. In accordance with the illustrated embodiment, provisions for precision measurements are available. In addition, switching equipment which responds to coded audio signals is provided. This switching equipment upon receipt of the coded audio signals, connects the azimuth-dependent 30 Hz. signal to the precision measuring equipment and utilizes a phase comparator network to derive a control voltage for precision measurement from the azimuth-dependent signal and the omnidirectional 30 Hz. signal.

Other features and advantages of the invention will become apparent with reference to the following description and accompanying drawings which show an illustrative embodiment of this invention.

DESCRIPTION OF THE PREFERRED EMBODIMENT

Figures 1, 4:
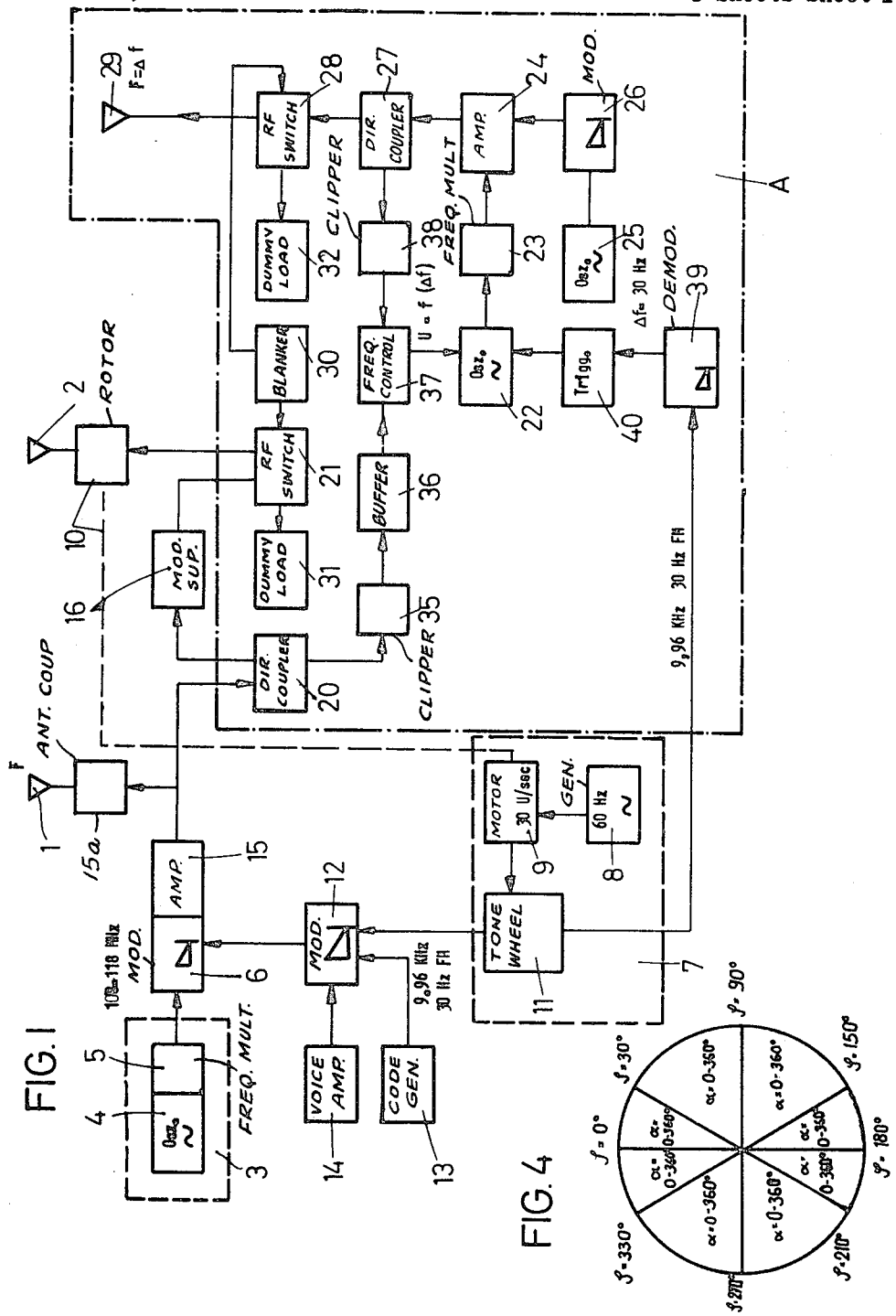
FIG. 1 is a block circuit diagram of a VOR transmitter including certain features of this invention.
FIG. 4 is a divisional illustration of a full circle into its 8 precision sectors in accordance with a VOR including certain features of this invention.

In accordance with the illustrated embodiment, the VOR system includes the conventional VOR components plus additional equipment. In FIG. 1 this additional equipment is indicated by the letter A and comprises those parts surrounded by a broken line. For more ready understanding of the improvement, the operating principles of a conventional VOR system will be briefly considered.

A conventional VOR system consists of two separate antennas to which RF energy is fed. Antenna 1 is omnidirectional whereas antenna 2 is of the rotating directional type. The directional antenna rotates at 30 r.p.s. The RF energy is fed to both antennas in a manner such that the individual RF fields of antennas 1 and 2 are in phase. This phase relationship produces a radiation field equal to the algebraic sum of the two components, one component which is amplitude modulated at 30 Hz. thru the rotational speed of the directional antenna, can be identified at all points within the radiation pattern. The phase of this amplitude-modulated signal varies with the bearings to the transmitter, i.e., it is proportional to the azimuth angle $\zeta$. In order to utilize this azimuth-dependent phase relationship for angular measurement, a reference phase is required. This reference phase is supplied by a second component of the energy existing in the RF radiation field. This second component is a signal oscillating at 30 Hz. with a phase angle which is independent of the azimuth angle. This reference frequency is generated by the omnidirectional field component. Thus, the phase difference between the reference signal and the variable signal is a direct function of azimuth angle $\zeta$. A 30 Hz. frequency is superimposed upon the omnidirectional component of the RF energy by means of a 9.96 kHz. sub-carrier which in turn is frequency-modulated by a 30 Hz. reference signal Thus at any point in the radiation field, the azimuth dependent 30 Hz. oscillation and the 30 Hz. omnidirectional signals are superimposed upon the 9.96 kHz. sub-carrier. This sub-carrier may be obtained through suitable demodulation and filtering. Phase comparator circuits are used to obtain azimuth by determining phase relationship between the signals.

The conventional VOR range includes an oscillator unit 3, which consists of an oscillator 4 and a frequency multiplier 5, which raises the oscillator frequency to a frequency F between 108 and 118 mHz. This carrier F is fed into a modulation stage 6. The 30 Hz. frequency-modulated 9.96 kHz. sub-carrier is produced by a generator unit 7. This generator unit 7 comprises a 60 Hz. generator 8 which controls a synchronous motor 9 rotating at 30 rev./sec. The synchronous motor 9 drives the rotating directional antenna 2 through a mechanical connection 10 and also, a notched tone wheel 11. The tone wheel cuts the field of a permanent magnet which is surrounded by a coil and the teeth of the tone wheel produce variations in the magnetic flux pattern. This varying flux field induces a proportional voltage in the coil. For example if a 9.96 kHz. sub-carrier is to be frequency-modulated at 30 Hz., then the tone wheel which rotates at 30 r.p.s. must have 332 teeth. The teeth are unequally spaced about the periphery, inducing in the coil a voltage proportional to the 30 Hz. frequency-modulated 9.96 kHz. sub-carrier. This voltage is fed to modulator 12 where the Morse code component generated in the station identification unit 13 and a voice component from unit 14 are applied. In the modulation stage 6 the voltage supplied from modulator 12 is superimposed on the carrier F, thus producing an amplitude modulated signal. After proper conditioning in the output stage 15 the modulated carrier is fed to an antenna coupler 15a and radiated from the omnidirectional antenna 1. The modulated carrier F is fed to a modulation suppressor and thence to the omnidirectional antenna 2. In the modulation suppressor 16 the modulation is removed from the carrier F, and the carrier is then radiated by the rotating directional antenna 2. In this way, the necessary fixed phase and frequency relationship between the two RF components is achieved. Up to this point the description covers the conventional VOR generating system.

To extend the installation so as to provide a precise azimuth definition, the connection between the output stage 15 and the modulation suppressor 16 is made via a directional coupler 20 and the connection between stage 16 and the directional antenna 2 is by means of a RF switching unit 21.

The supplementary section A contains an RF crystal oscillator 22 whose frequency and phase relationship is maintained fixed with respect to the 30 Hz. frequency supplied from generator unit 7. In a multiplier stage 23 the frequency of oscillator 22 is used to generate an additional frequency, $F-\Delta f$, separated by 30 Hz. from the nondirectional carrier F which is radiated from the omnidirectional antenna. Superimposed on this unmodulated $F-\Delta f$ frequency are code characteristics which are produced in the oscillator 25 and amplified in the modulator 26. From the output stage 24 this carrier is fed by means of a directional coupler 27 and a RF switching unit 28 to a supplementary omnidirectional antenna 29 for radiation.

In order to prevent the rotating directional antenna 2 from radiating RF energy during the interval of the precision measuring operations the RF switching unit 21 is controlled by a blanking stage 30. The blanking stage consists of an astable multivibrator. The energy supplied by the modulation suppressor 16 is fed to a dummy load 31 rather than to the rotating directional antenna 2. Simultaneously, the blanking stage 30 disconnects the dummy load 32 by means of the RF switching unit 28 and connects the directional coupler 27 to the supplementary antenna 29. This automatic switching equipment in the VOR range permits alternate switching from coarse to precision measurement at a rate adaptable to the operational requirements of the aircraft. For practical employment, a switching rate of 2 seconds for coarse and 2 seconds for precision measurement is recommended. VOR receivers not presently equipped for precision bearing indications are not adversely affected by the precision bearing signals due to the inherent inertia of the indicating equipment.

In order to obtain full benefit from the precise azimuth definition, it is desirable that the main carrier radiated from the omnidirectional antenna 1 differs from 30 Hz. from the secondary carrier radiated by the omnidirectional antenna 29. Further, it is desirable that there be a fixed phase relationship between the 30 Hz. frequency modulation of the VOR signal and the 30 Hz. difference existing between the two transmitters. For this reason frequency and phase controls have been included.

Serving to provide frequency control, a portion of the energy supplied to the omnidirectional antenna 1 is sampled by the directional coupler 20 and fed to a frequency control section 37 via a clipper 35 and a buffer circuit 36. Also, connected to this frequency control section via a clipper 38 is the decoupled portion of the energy of the supplementary carrier fed to the omnidirectional antenna 29. The clippers 35 and 38 serve to remove the modulation and the carrier as well as the supplementary carrier. For example, two diodes in a 180 degree out-of-phase arrangement may be used, followed by a band-pass filter which reconverts to the diode-generated square wave to a sine-wave.

In the frequency control section 37, a frequency-dependent DC voltage $V=f(\Delta f)$ is produced which provides the desired frequency lag in the oscillator 22. This is accomplished by means of a voltage sensitive capacitor. For phase control the 30 Hz. frequency-modulated 9.96 kHz. sub-carrier is sampled at the tone wheel 11 and rectified in a demodulator 39. The 30 Hz. signal of the differential frequency Δf is fed to a trigger stage 40 which triggers the oscillator 22. Triggering of the oscillator may, for example, be made by means of a PIN diode circuit.

With the addition of the supplementary Unit A, a conventional VOR signal may be adapted to precision measurement by radiating RF energy from the omnidirectional antenna 1 and supplementary antenna 29 only, with the rotating directional antenna switched to the off position. For precision measurement defining 8 precision measurement sectors, the omnidirectional antenna 1 is located at a distance 2λ from the supplemental antenna 29. Since the supplementary frequency F—Δf radiated by the supplementary antenna varies 30 Hz. from the carrier frequency F radiated by the omnidirectional antenna, a 30 Hz. beat frequency signal is generated whose phase is a function of the azimuth angle. This permits azimuth determination by comparing the phase of the azimuth-dependent beat with the phase of the 30 Hz. reference signal of the carrier F radiated from the VOR signal. The azimuth-dependent phase angle α of the beat frequency is determined by the equation $$\alpha = a/2\lambda \times 360° \times \sin \zeta$$

in which $a$ is the distance between the two omnidirectional antennas, $\zeta$ the azimuth angle and $\lambda$ the wavelength of the carrier F.

The above equation results in an ambiguous solution of the difference between the reference phase and the variable phase at any point in the radiation field over the full azimuth range from 0° to 360°. The phase angle of the beat frequency may never exceed 360°. The azimuth range of 0° to 360° is thus broken down into precision measurement sectors through which, in turn, the phase angle α of the beat frequency sweeps 0° through 360°. Due to the ambiguity in the phase angle α of the beat frequency, a coarse azimuth measuring is first required to determine in which of the precision measuring sectors the azimuth angle $\zeta$ to be measured is located. The azimuth angle may then be much more accurately defined employing the described precision measurement networks. As is seen from FIG. 4 the precision measurement sectors vary in size. An antenna spacing of 2λ results in 4 precision measurement sectors, each covering a 30° azimuth range plus four precision measurement sectors of 60° azimuth range each. In the 30° sectors, precision is improved 12 times as compared to the conventional VOR system, whereas in the 60° sector precision improvement is only 6 fold.

Figure 2:
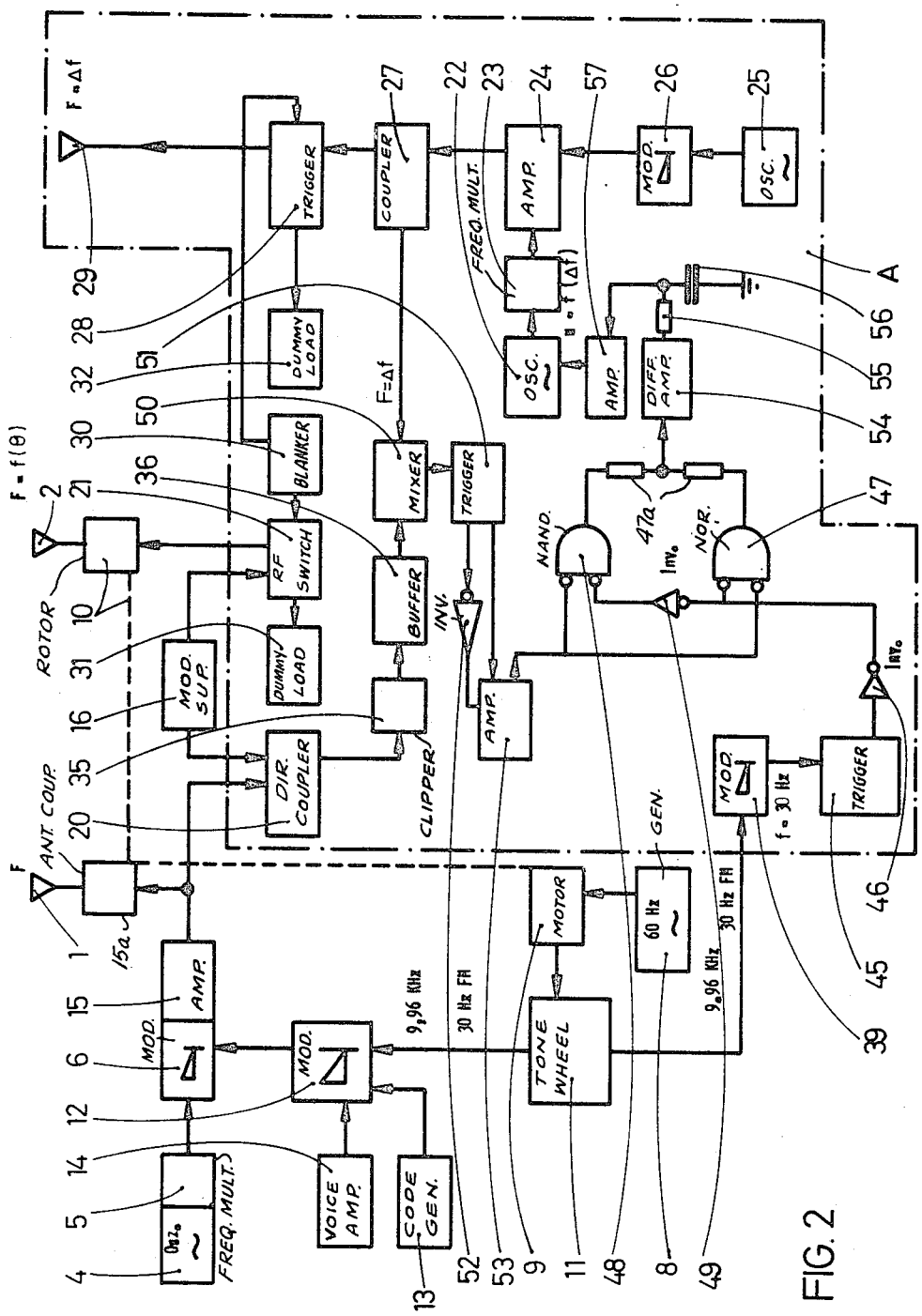
FIG. 2 is a block circuit diagram of a VOR transmitter modified in accordance with this invention and equipped with digital phase and frequency control means.

With reference to FIG. 2, a VOR range is illustrated including certain features of this invention. The VOR range illustrated utilizes digital control to maintain the fixed phase and frequency relationship of the 30 Hz. frequency difference between the supplementary carrier F—Δf and the nondirectional carrier F.

The digital control comprises a Schmitt trigger 45 whose output is connected to a NOR gate 47 via an inverter stage 46 and further, via another inverter stage 49, to a NAND gate 48. The output of the mixer 50 which receives its input from the buffer stage 36 and the directional coupler 27 is connected to a Schmitt trigger 51. Both outputs of the Schmitt trigger are connected to a summing amplifier 53. One output is directly connected and the other passes thru an inversion stage 52. The output signal from the summing amplifier 53 is connected to the second input to the NAND gate 48 and the second input of the NOR gate 47. The outputs of both gates are symmetrically connected by means of resistors 47a to a differential amplifier 54 which in turn is connected to another summing amplifier 57 via an integrating circuit consisting of the elements 55 and 56. For phase and frequency control, a frequency and phase dependent DC voltage from the output of the summing amplifier 57 is connected to the oscillator 22.

Figure 3:
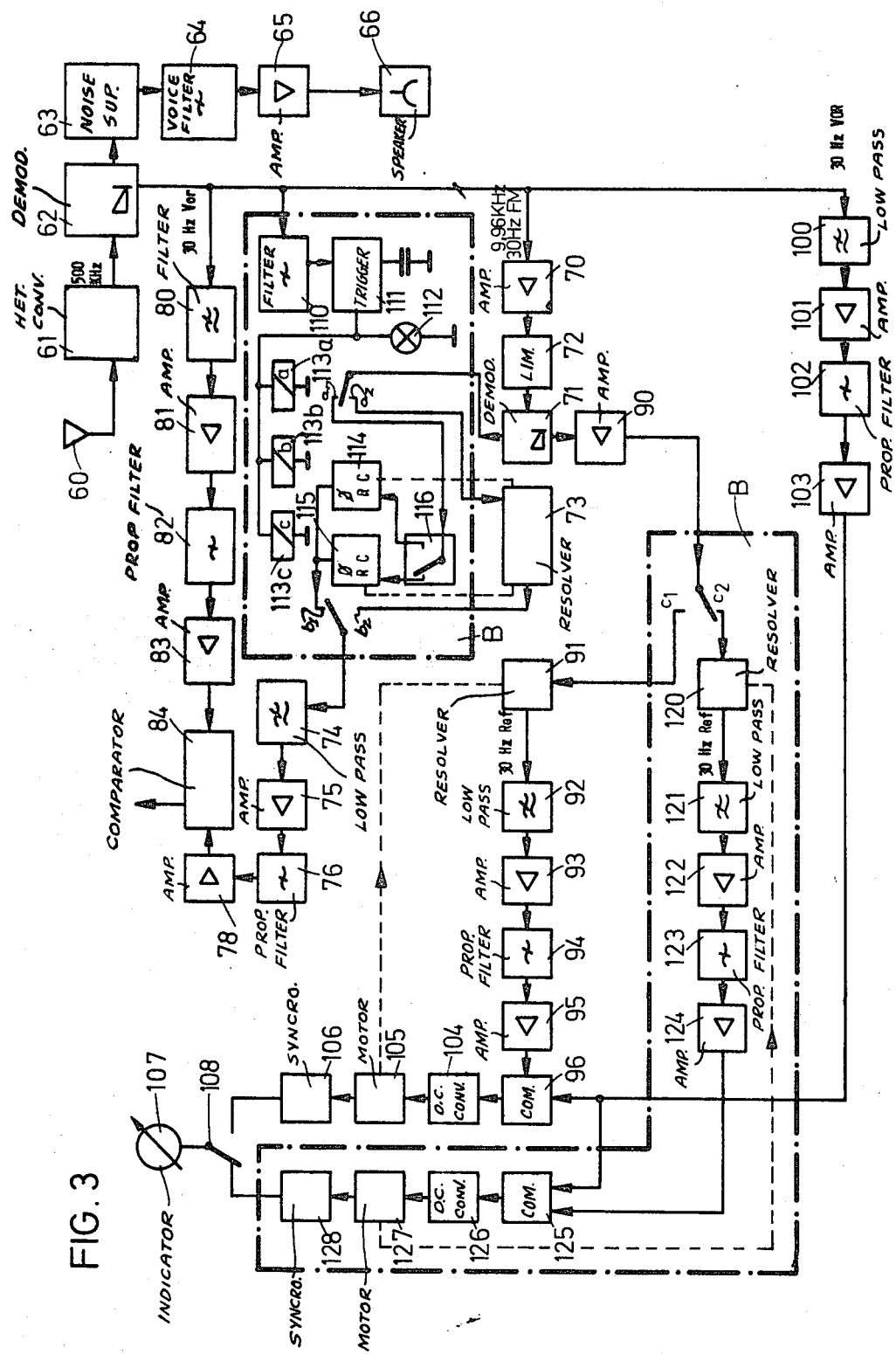
FIG. 3 is a block circuit diagram of a VOR receiver modified in accordance with this invention.

With reference to FIG. 3, a VOR receiver is illustrated including certain features of this invention. The VOR receiver includes a conventional receiver with a supplementary Unit B which is enclosed within a broken line in the drawing.

The following description initially describes the components of a conventional VOR receiver which are included for establishing bearings to a conventional VOR range and which are used for coarse bearing indication with the modified VOR signal. The RF frequency received by antenna 60 is converted to a 500 kHz. intermediate frequency in the heterodyne unit 61. The 500 kHz. intermediate frequency is fed to a demodulator 62 for demodulation. The low frequency output of the demodulator consists of the 30 Hz. frequency-modulated 9.96 kHz. signal, the variable 30 Hz. signal and a signal containing voice and station identification code. The latter signal is fed to the voice filter 64 and amplifier 65 via a noise suppressor 63. This makes it possible to hear the station identification code and voice in the headset or speaker of a reproduction unit 66.

The audio section of the VOR receiver receives the 30 Hz. frequency-modulated 9.96 kHz. reference signal and the variable 30 Hz. signal. From these two signals the audio section of the receiver supplies one signal for the course deviation indicator and another signal for the bearing indicator. For this purpose the receiver is essentially divided into two sections in each of which the phases of the 30 Hz. reference signal and the variable 30 Hz. signal are compared. However, both sections are connected to a common section for demodulation of the 30 Hz. frequency modulated 9.96 kHz. signal. This common demodulator comprises an amplifier 70 of the limiter stage 72 and a demodulator 71 which supplies the 30 Hz. reference signal.

To obtain a course deviation indication the variable 30 Hz. signal is fed to a phase comparator 84 via a low-pass filter 80, an amplifier 81, a propeller modulation filter 82 and a second amplifier 83. The propeller modulation filter 82 serves to eliminate from the variable 30 Hz. signal the interfering modulations introduced by the rotating propeller.

The phase comparator 84 receives the demodulated 30 Hz. reference signal from a resolver 73, a low-pass filter 74, an amplifier 75, a propeller modulation filter 76 and a second amplifier 78. The connection of the demodulator 71 to the low-pass filter 74 through the resolver 73 will subsequently be further described. By adjusting the course selector of a course deviation indicator (not shown on the diagram) the resolver 73 is manually adjusted so that, when flying the desired course, the DC output voltage of the phase comparator 84 is zeroed as a result of the existing phase relationship established between the variable 30 Hz. signal and the 30 Hz. reference signal.

For bearing indication the 30 Hz. reference signal from the demodulator 71 is fed by way of an amplifier 90 to an automatic resolver 91, which effects a phase shift of the 30 Hz. reference signal. This signal is fed via a low-pass filter 92, an amplifier 93, a propeller modulation filter 94 and a second amplifier 95 to a phase comparator 96.

The variable 30 Hz. signal from the demodulator 62 is fed to a low-pass filter 100, an amplifier 101, a propeller modulation filter 102 and an additional amplifier 103. The signal is also fed to the phase comparator 96. The DC voltage generated in the comparator 96 is fed to a DC–AC converter 104 for conversion to AC voltage and subsequent amplification. This DC voltage is also supplied to a servomotor 105 which adjusts the rotor of a differential synchro 106 and of an automatic resolver 91 until the phase of the 30 Hz. reference signal is in quadrature with the phase of the variable 30 Hz. signal at the phase comparator stage 96. Up to this point, the DC voltage at the phase comparator output is zero causing the rotor of the differential synchro 106 to stop. The differential synchro supplies a voltage to the bearing indicator proportional to the azimuth $\zeta$.

To the extent previously discussed, the VOR receiver is of conventional design and compatible without modification, with VOR facilities modified according to the invention for coarse bearing indication.

The supplementary section B for the modified VOR receiver includes a bank of relays which control the switching from coarse to precision measurement and an additional indicator channel for precision bearing indication. For precision bearing indication, the audio signal from the demodulator 62 is supplied to a filter 110 which extracts the coding. The coding is fed to a Schmitt trigger 111. The coding is contained in the composite signal when, during the blanking period, the VOR range is sending precision measuring signals. The output voltage of the Schmitt trigger 111 during the precision measuring cycle illuminates a lamp 112, which indicates to the pilot whether the equipment is operating on precision or coarse measuring mode. The Schmitt trigger also energizes three switching relays 113a, 113b and 113c. Instead of three relays, one single relay with the necessary number of contacts may be used. These relays operate the double-throw contacts $a1$ $a2$, $b1$ $b2$ and $c1$ $c2$.

For precision heading indication, the supplementary section B contains several RC phase shifters 114 and 115 which correlate the phase relationship between coarse and precision indication. For the described illustrative embodiment having a $2\lambda$ antenna distance and consequently 30° and 60° precision measuring sectors, two RC phase shifters are required: one for the 30° sectors and the other for the 60° sectors. Change-over from one RC phase shifter to the other is effected by means of a mechanical switch 116 which is switched over to the appropriate position during setting of the resolver 73.

For precision measuring, the 30 c./s. reference signal is fed to a resolver 120 via the amplifier 90 and contact $c2$ of the double-throw switch and thence via a low-pass filter 121, an amplifier 122, a propeller modulation filter 123 and an additional amplifier 124 to the phase comparator 125. The variable 30 c./s. signal from the amplifier 103 is also fed to the comparator 125. In the phase comparator 125, a DC voltage corresponding to the phase difference between the two 30 c./s. signals is generated and converted to AC voltage in a DC–AC converter 126. The amplified voltage is supplied to a servomotor 127 which adjusts the rotor of a differential synchro 128 and also the rotor of the automatic resolver 120 until the phase of the reference signal in the phase comparator 125 is in quadrature with the phase of the variable signal. The output voltage of the differential synchro is connected to the bearing indicator 107 via the coarse precision switch 108.

Transfer from coarse to precision indication and vice versa is accomplished with the relays 113a, 113b and 113c which are excited for precision indication during reception of the audio coding. Relay 113a operates the double throw switch $a1$, $a2$ relay 113b the double throw switch $b1$, $b2$ and relay 113c the double throw switch $c1$, $c2$. With the switch positions as shown in FIG. 3 the VOR receiver is operating in the precision measuring mode and via the contacts $a1$, $b1$ of the double throw switches the RC phase shifter, which is associated with the appropriate precision measuring sector, is introduced into the path of the 30 Hz. reference signal being fed to the phase comparator 84 of the heading indicator. In addition, the 30 Hz. reference signal is introduced into the precision bearing signal path via switch contact $c2$.

A VOR system modified according to the invention by relatively simple change to conventional VOR beacons and receiving equipment is advantageous, since it provides precision measurement in addition to existing coarse azimuth measuring features. Existing circuits for coarse measurement are retained. Coarse azimuth definition is still ±2°, the added circuits increasing the resolution to better than ±0.03°. This is a particular advantage since the VOR system widely used in civil air navigation can thus be quickly adapted to the strict requirements as to bearing accuracy at minimum cost.

I claim:
1. A method for producing a VHF omnidirectional signal for air navigation which utilizes a first carrier amplitude modulated with a first signal which is in turn frequency modulated with a second signal, said modulated first carrier being nondirectionally radiated from an omnidirectional antenna and which further utilizes a directional rotating antenna radiating said first carrier, the steps comprising blanking the radiation from said rotating antenna during a short interval and superimposing a second supplemental carrier spaced from said first carrier by an amount equal to said second signal upon said first carrier so as to produce an azimuth dependent beat frequency.

2. The method of claim 1 which further comprises the steps of directionally radiating said second supplemental carrier, positioning the point of radiation of said second carrier by a whole multiple of a wavelength of said second carrier from said omnidirectional antenna.

3. The method set forth in claim 2 wherein said point of radiation of said second carrier is positioned two wavelengths of the first carrier from the omnidirectional antenna thereby serving to produce eight (8) precision measurement sectors in each of which the phase of the beat frequency sweeps 360°.

4. The method set forth in claim 3 which further includes the step of superimposing an audio code upon said second supplemental carrier.

5. In combination with an apparatus for producing a VHF radio signal which includes a first oscillator for producing a first carrier, a generator for producing a first signal frequency-modulating a second signal, an omnidirectional antenna and a rotating directional antenna, the improvement comprising a second oscillator producig a second supplementary carrier which is separated from the first carrier by an amount equal to the frequency of said first signal, a second supplementary antenna, a first RF switch for selectively connecting said second oscillator to said supplementary antenna, a second RF switch connected between said first oscillator and said directional antenna, said first and second RF switches functioning in combination to alternately connect said first and second oscillators respectively to said rotating directional antenna or to said supplementary antenna, phase and frequency control means for maintaining a predetermined phase and frequency relationship between said second supplementary carrier and said first carrier.

6. An apparatus in accordance with claim 5 comprising a triggering means connected to said first and second RF switches which serves to alternately actuate each of said switches at a relatively low switching rate.

7. An apparatus according to claim 5, characterized in that said frequency and phase control means includes a frequency control unit to which the first carrier radiated by the omnidirectional antenna and the second supplementary carrier radiated by the supplemental antenna are applied and said frequency control unit supplying to said supplementary oscillator a correction voltage which serves to maintain the predetermined frequency separation between the two carriers.

8. An apparatus according to claim 5 wherein said frequency and phase control means includes an FM demodulator which senses the phase of the first signal produced in said generator and which supplies a voltage to said triggering means for controlling the phase of the frequency separation between said carriers.

9. An apparatus according to claim 5, wherein correction means are included in said frequency and phase control means to establish a fixed phase and frequency relationship between the second oscillator and said first signal from the generator.

10. An apparatus according to claim 5, wherein the frequency and phase control means are of a digital construction.

11. An apparatus for receiving a radio signal which includes a superheterodyne receiver which is fed by a receiving antenna and which supplies at its demodulator output a first signal frequency-modulated by a second signal, an azimuth-dependent variable third signal, and a coded audio signal demodulator stage for separating said second signal from the first signal and a phase comparator for determining the bearing and for coarse deviation indication by measuring the phase angle between said second signal and said third signal, said apparatus comprising means for precision azimuth measurement, switching means responsive to an audio coding, said switching means feeding said second signal to said precision measurement means, said precision measurement means including a second phase comparator sampling said second signal and the third signal and phase comparison means for producing a control voltage realted to said sampled second and third signals for precision bearing indication.

12. An apparatus in accordance with claim 11, wherein said switching means includes at the demodulator output of the superheterodyne receiver a filter serving to separate an audio component from the input signal and switching means connected to the output of said filter and controlled by the audio signal for switching said coarse measurement means between coarse and precision indication.

13. An apparatus according to claim 12 which includes coarse azimuth measurement means, a switching relay connected to said precision measurement means and said coarse measurement means and said demodulator for switching said measurement between said coarse and precision measurement means.

14. An apparatus in accordance with claim 13 wherein said coarse deviation measuring means includes at least one phase shift network and switching means for selectively switching said phase shift network into and out of said coarse deviation measuring means.

References Cited

UNITED STATES PATENTS

| | | | |
|---|---|---|---|
| 2,975,417 | 3/1961 | Alexander et al. | 343—106 |
| 2,978,701 | 4/1961 | Pickles | 343—106 |
| 3,262,117 | 7/1966 | Stover. | |
| 3,369,237 | 2/1968 | Cronkhite | 343—107 |
| 3,383,687 | 5/1968 | Shames | 343—106 |

RODNEY D. BENNETT, Primary Examiner

T. H. TUBBESING, Assistant Examiner

U.S. Cl. X.R.

343—107